United States Patent
Baugh

(10) Patent No.: US 6,896,368 B2
(45) Date of Patent: May 24, 2005

(54) MULTIFOCAL SOFT CONTACT LENS WITH HORIZONTALLY DECENTERED LENSLET AND INDICATOR MARKING

(76) Inventor: Thomas K. Baugh, 307 W. Main, Denison, TX (US) 75020

( * ) Notice: Subject to any disclaimer, the term of this patent is extended or adjusted under 35 U.S.C. 154(b) by 0 days.

(21) Appl. No.: 10/431,149

(22) Filed: May 7, 2003

(65) Prior Publication Data

US 2004/0223116 A1 Nov. 11, 2004

(51) Int. Cl.⁷ ............................................... G02C 7/04
(52) U.S. Cl. ................... 351/161; 351/160 H
(58) Field of Search .................. 351/160 R, 160 H, 351/161, 162

(56) References Cited

U.S. PATENT DOCUMENTS

| | | | |
|---|---|---|---|
| 4,162,122 A | 7/1979 | Cohen | 351/161 |
| 4,210,391 A | 7/1980 | Cohen | 351/161 |
| 4,302,081 A | 11/1981 | Tsuetaki | 351/161 |
| 4,618,228 A | 10/1986 | Baron et al. | 351/161 |
| 4,637,697 A | 1/1987 | Freeman | 351/161 |
| 4,641,934 A | 2/1987 | Freeman | 351/159 |
| 4,704,016 A | 11/1987 | de Carle | 351/161 |
| 4,909,818 A | 3/1990 | Jones | 65/31 |
| 4,981,342 A | 1/1991 | Fiala | 350/403 |
| 5,071,244 A | 12/1991 | Ross | 351/161 |
| 5,151,723 A | 9/1992 | Tajiri | 351/161 |
| 5,422,687 A | 6/1995 | Tanaka et al. | 351/161 |
| 5,635,998 A | 6/1997 | Baugh | 351/161 |
| 5,757,458 A | 5/1998 | Miller et al. | 351/162 |
| 5,760,870 A * | 6/1998 | Payor et al. | 351/160 H |
| 5,907,386 A | 5/1999 | Gupta et al. | 351/177 |
| 5,982,543 A | 11/1999 | Fiala | 359/565 |
| 6,120,148 A | 9/2000 | Fiala et al. | 351/161 |
| 6,199,982 B1 * | 3/2001 | Oyama et al. | 351/161 |
| 6,217,171 B1 | 4/2001 | Auten et al. | 351/160 H |
| 6,250,757 B1 | 6/2001 | Roffman et al. | 351/161 |
| 6,511,178 B1 | 1/2003 | Roffman et al. | 351/161 |

OTHER PUBLICATIONS

Borish, "Clinical Refraction" (1975) –pp. 648–649.

* cited by examiner

Primary Examiner—Scott J. Sugarman
(74) Attorney, Agent, or Firm—Konneker & Smith, P.C.

(57) ABSTRACT

A multifocal soft contact lens has a main carrier lens with a distance vision axis coincident with its geometric center and extending transversely through the intersection of transverse horizontal and vertical reference axes, and a smaller near vision lenslet supported on the carrier lens. The lenslet has a near vision axis extending through the horizontal reference axis in a nasally decentered relationship with the distance vision axis. To facilitate the proper rotational placement of the lens on the eye of a wearer, a nasal indicator mark is appropriately formed on the horizontal reference axis of the lens in a nasally offset relationship with the carrier lens center.

33 Claims, 1 Drawing Sheet

MULTIFOCAL SOFT CONTACT LENS WITH HORIZONTALLY DECENTERED LENSLET AND INDICATOR MARKING

BACKGROUND OF THE INVENTION

The present invention generally relates to contact lens apparatus and, in a preferred embodiment thereof, more particularly provides a multifocal soft contact lens utilizing a horizontally decentered lenslet and a nasal indicator marking.

Present day multifocal soft contact lenses used in the correction of presbyopia are typically of the nontranslating type, in which there is very little movement of the inserted lens on the wearer's eye, and comprise concentrically disposed near and far vision portions which are usually also concentric with the geometric center of the overall lens structure. Unfortunately, this conventional multifocal soft contact lens design meets with success from a vision standpoint in only about fifty percent of the cases, relying as it does upon simultaneous perception and selective attention to the regard at near when viewed through the multifocal portion of the lens, with optimum performance of these lenses being predicated upon alignment with the visual axis. However, the human eye does not actually maintain this condition. Accordingly, diplopia due to parallax commonly occurs due to the misalignment of the multifocals' images with respect to the eye's visual axis.

In view of this it can readily be seen that a need exists for an improved multifocal soft contact lens construction. It is to this need that the present invention is directed.

SUMMARY OF THE INVENTION

In carrying out principles of the present invention, in accordance with a preferred embodiment thereof, a multifocal contact lens is provided which is representatively a soft contact lens but which could alternatively be a hard contact lens structure. The multifocal lens, via a unique positional relationship between near and distance vision components thereof, provides a wearer with improved near vision, and illustratively includes a first lens portion in the form of a main distance vision lens body and a second lens portion associated with the lens body and including a separate, smaller near vision lenslet. Each of these lens portions representatively has a circular shape, but either could have a different shape such as an elliptical shape.

The main lens body has opposite front and rear sides, a geometric center, a distance vision axis coincident with the geometric center, and transverse horizontal and vertical reference axes extending transversely through the distance vision axis, a portion of the horizontal reference axis extending from one side of the vertical reference axis toward the nose of a wearer when the contact lens is properly oriented on an eye of the wearer.

In an illustrated embodiment of the contact lens, the lenslet has a near vision axis nasally offset from the distance vision axis and extending through the horizontal reference axis, and a geometric center through which the near vision axis extends. The lenslet may be embedded in the main lens body, or secured to its front or rear side as desired. Representatively, the nasal offset distance of the near vision axis is in the range of from about 0.1 mm to about 4.0 mm.

To assist in properly orienting the contact lens on a wearer's eye, a nasal indicator is disposed on the lens in a nasally offset relationship with the distance vision axis. Representatively, the nasal indicator is an "N" and is disposed on the horizontal reference axis.

DETAILED DESCRIPTION

Figure 1:
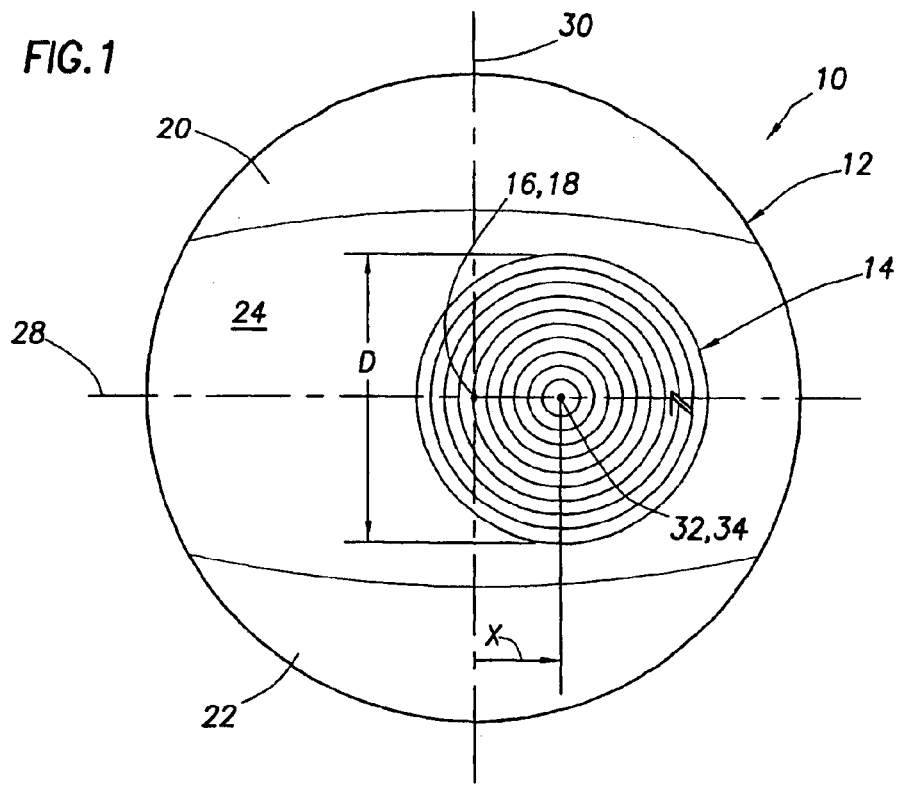
FIG. 1 is an enlarged scale front side elevational view of a multifocal soft contact lens embodying principles of the present invention.
Figure 2:
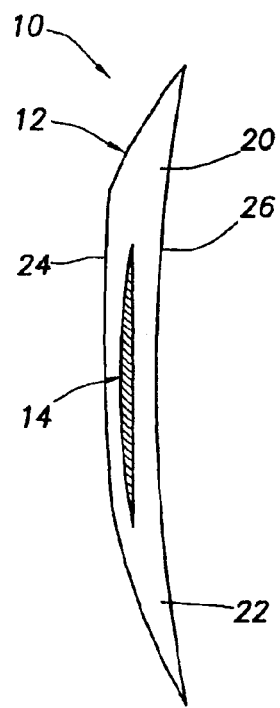
FIG. 2 is a leftwardly directed cross-sectional view through the FIG. 1 lens.
Figure 2A:
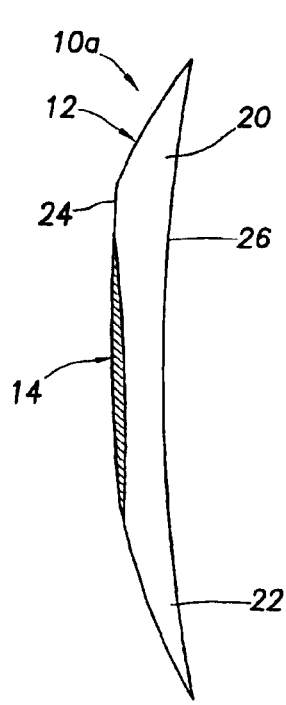
FIG. 2A is a cross-sectional view, similar to that in FIG. 2, through a first alternate embodiment of the FIG. 1 lens.
Figure 2B:
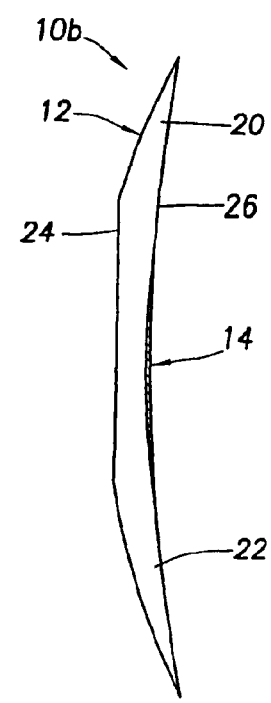
FIG. 2B is a cross-sectional view, similar to that in FIG. 2, through a second alternate embodiment of the FIG. 1 lens.

Referring initially to FIGS. 1 and 2, the present invention provides a specially designed multifocal contact lens 10 which is representatively a bifocal lens used for the correction of presbyopia. Lens 10, which is representatively a soft contact lens but could alternatively be a hard contact lens, has a main or carrier lens portion 12 and a smaller lens portion (see FIGS. 2–2B) including a separate lens structure 14 commonly referred to as a "lenslet".

The representatively illustrated main lens portion 12 provides distance vision correction and has a circular shape with a 15 mm diameter, a geometric center 16 coincident with the distance vision axis 18 of the overall lens structure 10, top and bottom thinned body portions 20 and 22 which provide the inserted lens with positional stabilization on the wearer's eye, front and rear sides 24 and 26, and horizontal and vertical reference axes 28,30 transversely extending through the centralized distance vision axis 18. Circular main lens portion 12 may have a greater or smaller diameter, and may also have a different shape such as an elliptical shape. Moreover, on-eye positional stabilization may be provided by other means such as, for example, slab-off prism, prism ballast, sectoral thickening of the lens, lens bosses, lens shelves, or truncations.

Lenslet 14 provides near vision correction and representatively has a circular configuration with a diameter D preferably in the range from about 1 mm to about 10 mm, but could have other shapes, such as for example elliptical. To suit the particular application, the lenslet 14 may be in the form of an aspheric lens, a diffractive lens, a holographic lens, an annular type of lens including zone plates and eschellettes, a birefringent lens, or discrete segments of symmetric or asymmetric design. Material used in constructing the lenslet 14 may be soft, flexible or rigid and capable of transmission of light through the medium, either transparent or selectively transparent.

Construction of the lenslet 14 may be carried out in a variety of suitable manners including conventional lathing, molding, casting, double side molding, injection molding, sheet films, pressing, lithographic techniques, thin film deposition, laser ablation, masking including holographic production techniques, wire EDM methods and light curing techniques. The refractive index of the lenslet 14 would typically be higher that the refractive index of the carrier lens portion 12, but could, if desired, be the same or less that the refractive index of the carrier lens portion 12.

As illustrated in FIG. 1, lenslet 14 has a geometric center 32 which is coincident with its near vision axis 34. According to a feature of the present invention, the near vision axis 34 extends through the horizontal reference axis 28 and is nasally offset (i.e., toward the nose of the lens wearer) from the distance vision axis 18 along the horizontal axis 28 by an offset distance X which can vary depending on the size of the main lens portion 12 but which is representatively in the range of from about 0.1 mm to about 4.0 mm. To facilitate the proper orientation of the contact lens 10 on the wearer's eye, a nasal indicator, such as the illustrated "N" is suitably placed on the horizontal reference axis 28 of the contact lens 10 in a nasally offset location from its geometric center 16. The contact lens 10 illustrated in FIG. 1 is representatively a right lens. Accordingly, the nasal indicator "N" is rightwardly offset from the geometric lens center 16 as viewed in FIG. 1.

In developing the present invention it has been found that the described unique relative positioning of the distance and near vision axes 18,34 advantageously tends to provide a wearer of the contact lens 10 with substantially improved near vision compared to conventional multifocal contact lenses with concentric near and far vision portions.

As illustrated in FIG. 2, the lenslet 14 is representatively encapsulated in a suitable manner within the interior of the main lens portion 12. Placement of the lenslet 14 into the interior of the main or carrier lens portion 12 may be carried out in a variety of known manners including a composite encapsulated mold technique, mechanical insertion, ultrasonic insertion and lamination procedures. As illustrated in the alternate contact lens embodiment 10*a* shown in FIG. 2A, the lenslet 14 may be suitably secured to the front side 24 of the main lens 12. As a further alternative, as illustrated in the additional alternate contact lens embodiment 10*b* shown in FIG. 2B, the lenslet 14 may be suitably secured to the rear side 26 of the main lens 12. This alternate placement of the lenslet 14 on the front or back side 24,26 of the lens portion 12 may be carried out in a number of known manners including lamination, inlay, onlay, encapsulation, pagination, UV or visible light curing, heating, gluing, surface treatment such as corona discharge, or catalytic processes.

The foregoing detailed description is to be clearly understood as being given by way of illustration and example only, the spirit and scope of the present invention being limited solely by the appended claims.

What is claimed is:

1. A contact lens comprising:
 a main lens body having:
  opposite front and rear sides,
  a geometric center,
  a first vision axis coincident with said geometric center, and
  transverse horizontal and vertical reference axes extending transversely through said first vision axis, a portion of said horizontal reference axis extending from one side of said vertical reference axis toward the nose of a wearer when said contact lens is properly oriented on an eye of the wearer; and
 a lens portion smaller than said main lens body, operatively associated with said main lens body, and having:
  a second vision axis nasally offset from said first vision axis and passing through the center of said lens portion.

2. The contact lens of claim 1 wherein:
said contact lens is a soft contact lens.

3. The contact lens of claim 1 wherein:
said first vision axis is a distance vision axis.

4. The contact lens of claim 3 wherein:
said second vision axis is a near vision axis.

5. The contact lens of claim 1 wherein:
said second vision axis is a near vision axis.

6. The contact lens of claim 1 wherein:
said second vision axis extends through said portion of said horizontal reference axis.

7. The contact lens of claim 1 wherein:
said main lens body has a circular configuration.

8. The contact lens of claim 7 wherein:
said lens portion includes a lenslet having a circular configuration.

9. The contact lens of claim 1 wherein:
said lens portion includes a lenslet having a circular configuration.

10. The contact lens of claim 1 wherein:
said lens portion includes a lenslet embedded in said main lens body.

11. The contact lens of claim 1 wherein:
said lens portion includes a lenslet disposed on said front side of said main lens body.

12. The contact lens of claim 1 wherein:
said lens portion includes a lenslet disposed on said rear side of said main lens body.

13. The contact lens of claim 1 further comprising:
a nasal indicator nasally offset from said vertical reference axis.

14. The contact lens of claim 13 wherein:
said nasal indicator is disposed on said portion of said horizontal reference axis.

15. The contact lens of claim 13 wherein:
said nasal indicator is an "N".

16. A multifocal soft contact lens comprising:
 a main lens body having:
  opposite front and rear sides,
  a geometric center,
  a distance vision axis coincident with said geometric center, and
  transverse horizontal and vertical reference axes extending transversely through said distance vision axis, a portion of said horizontal reference axis extending from one side of said vertical reference axis toward the nose of a wearer when said contact lens is properly oriented on an eye of the wearer; and
 a lenslet, smaller than said main lens body, carried on a portion of said main lens body, and having:
  a near vision axis nasally offset from said distance vision axis and extending through said portion of said horizontal reference axis and the center of said lenslet.

17. The contact lens of claim 16 wherein:
said lenslet has a geometric center through which said near vision axis extends.

18. The contact lens of claim 16 wherein:
said main lens body has a circular configuration.

19. The contact lens of claim 18 wherein:
said lenslet has a circular configuration.

20. The contact lens of claim 16 wherein:
said lenslet has a circular configuration.

21. The contact lens of claim 16 wherein:
said lenslet is embedded in said main lens body.

22. The contact lens of claim 16 wherein:
said lenslet is disposed on said front side of said main lens body.

23. The contact lens of claim 16 wherein:
said lenslet is disposed on said rear side of said main lens body.

24. The contact lens of claim 16 further comprising:

a nasal indicator nasally offset from said vertical reference axis.

25. The contact lens of claim 24 wherein:

said nasal indicator is disposed on said portion of said horizontal reference axis.

26. The contact lens of claim 24 wherein:

said nasal indicator is an "N".

27. The contact lens of claim 16 wherein:

said near vision axis is nasally offset from said distance axis by a distance within the range of from about 0.1 mm to about 4.0 mm.

28. A contact lens comprising:

a lens body having a geometric center;

a first vision axis coincident with said geometric center and disposed in a first vision correction area; and a second vision axis nasally offset from said geometric center and extending through the center of a second vision correction area.

29. The contact lens of claim 28 wherein:

said first vision axis is a distance vision axis, and said second vision axis is a near vision axis.

30. The contact lens of claim 29 wherein:

said lens body has transverse horizontal and vertical reference axes extending through said geometric center, and said near vision axis extends through said horizontal reference axis.

31. The contact lens of claim 28 further comprising:

a nasally offset lenslet carried by said lens body, said second vision axis extending through said lenslet.

32. The contact lens of claim 28 wherein:

said contact lens is a soft contact lens.

33. The contact lens of claim 28 wherein:

said lens body has a circular configuration.

* * * * *